Nov. 10, 1959  J. PILNÝ  2,912,646
IMAGE PRODUCING DEVICES

Filed Aug. 1, 1955 2 Sheets-Sheet 1

INVENTOR.
JIŘI PILNÝ
BY Richard Ernst
AGENT

INVENTOR.
JIŘI PILNÝ
BY Richard [illegible]
AGENT

United States Patent Office 2,912,646
Patented Nov. 10, 1959

2,912,646

IMAGE PRODUCING DEVICES

Jiří Pilný, Prague, Czechoslovakia, assignor to Tesla, narodni podnik, Prague-Hloubetin, Czechoslovakia, a company of Czechoslovakia Application August 1, 1955, Serial No. 525,708

4 Claims. (Cl. 324—71)

The present invention relates generally to image producing devices, and is particularly directed to devices producing an image characteristic of a property or properties of an object by means of an electric or magnetic field.

Heretofore, it has been usual to produce an image of an object by the affect of the object upon light or corpuscular rays which in turn control the formation of the image. As distinguished from this usual arrangement, it is an object of the present invention to provide a device wherein an electric or magnetic field, or a combination of electric and magnetic fields, is made to vary by the object of which an image is to be produced, and the variations in such field or fields are employed to control the formation of the image.

Different substances are distinguished by certain physical and chemical properties, some of which can influence an electric or magnetic field. For example, these properties may be capable of changing the direction, the density and the intensity of the lines of force of a field into which an object containing such substances is inserted. Thus, if a flat object is placed in a homogeneous field at right angles to the lines of force of the latter, the field changes at various points in its cross-section depending upon the chemical and physical properties of the object at the corresponding points of the latter. Such changes in the field can therefore be used to control the formation of an image which is characteristic of the chemical and physical properties of the object influencing the field.

The most important physical and chemical properties of a substance capable of influencing an electric or magnetic field are the dielectric constant, the power factor, the electric conductivity, the ion mobility and the magnetic permeability of the substance. In any case, the kind of field employed for controlling the formation of the image has to be selected so as to be influenced by the particular property of the object for which a characteristic image is desired. Thus, if an image characteristic of the variations in the dielectric constant, the power factor or the electric conductivity throughout an object is desired, an electric field will be employed, while an image characteristic of the variations in magnetic permeability throughout an object can be obtained through the use of a magnetic field.

In accordance with the present invention, an image producing device includes means for scanning the effect upon an electric or magnetic field of the object at various points in the latter, and means indicating the variations in the field at the different scanned points thereby to provide an image characteristic of the object and of the variations in the chemical and physical properties of the object.

In one aspect of the invention, a field of force is concentrated and assumes the shape of a narrow beam across which the object is extended. The object and the concentrated field are moved relative to each other so that the concentrated field impinges successively against different points of the object and is thereby varyingly influenced by the chemical and physical properties of the object at such points.

In another aspect of the invention, the obejct is fixedly positioned in a parallel field established between a pair of plates, and one of such plates includes a mosaic of metal particles insulated from each other and connected to a switching arrangement which connects the individual metal particles to the indicating part of the device in a predetermined sequence, so that the indicating part of the device provides an image characteristic of the chemical or physical properties of the object at the various points or locations in the latter aligned with the metal particles of the mosaic.

In order that the invention may be clearly understood, illustrative embodiments thereof are hereinafter described in detail with reference to the accompanying drawings forming a part hereof, and wherein:

Fig. 1 diagrammatically represents an image producing device constructed in accordance with one embodiment of this invention;

Figure 1:
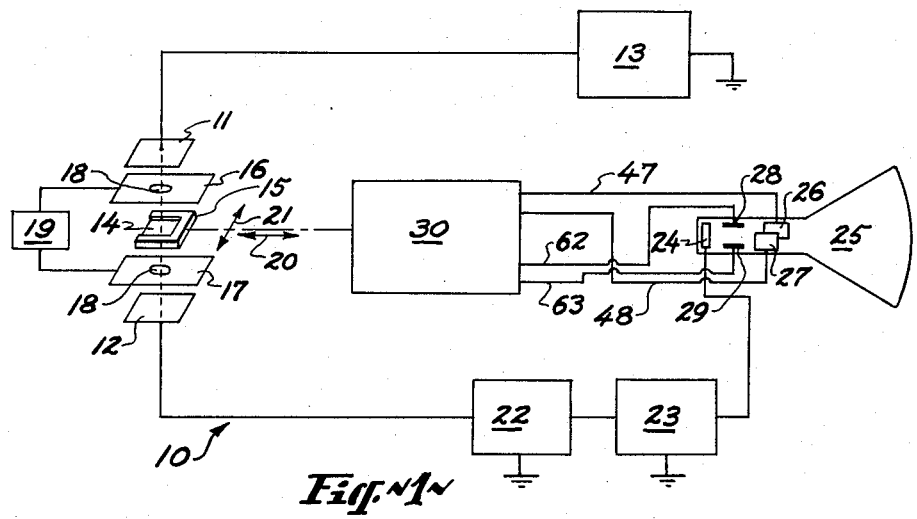

Referring to the drawings in detail, and initially to Fig. 1 thereof, an image producing device embodying this invention is there illustrated and generally identified by the reference numeral 10. The image producing device 10 employs a high frequency electric field and is particularly adapted to function as a microscope to provide a magnified image characteristic of the chemical and physical properties of the substances throughout an object which are capable of influencing such a field.

The high frequency electric field to be influenced by the object is created between two condenser plates 11 and 12, and the plate 11 is connected to one terminal or pole of an oscillator 13, while the other pole of the latter is grounded. The object 14, of which an image is to be produced, is mounted in or on a movable carrier 15 which may be formed of a homogeneous material and dimensioned to extend across the field in all relative positions of the field and carrier so as to avoid any variations in the influence of the carrier 15 on the field between condenser plates 11 and 12, or, as shown in the illustrated embodiment, the carrier 15 may be in the form of an open frame supporting the object 14 only at the edges of the latter and arranged so that, in all relative positions of the carrier and the field, which is concentrated as hereinafter described in detail, the carrier is removed from the concentrated field and has no influence upon the latter.

Figure 3:
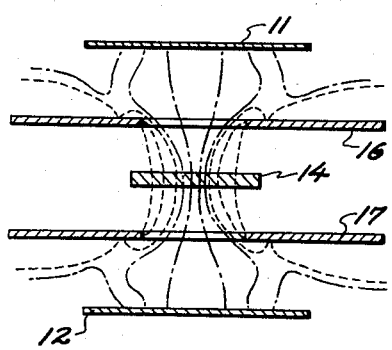
Fig. 3 is a diagrammatic illustration of the lines of force in the field created in the device of Fig. 1.

Disposed between the object carrier 15 and the condenser plates 11 and 12 are two metal discs 16 and 17, respectively, having aligned apertures 18 and connected to a source 19 generating a concentration field. The field generated by the source 19, for example, by an oscillator, is of the same kind as, and parallel to, the field generated between the plates 11 and 12 by the oscillator 13, that is, a high frequency electric field, but has different parameters. Referring to Fig. 3, wherein the lines of force of the main or scanning field are represented by dot-dash lines and the lines of force of the concentrating field are represented by dotted lines, it will be seen that the concentrating field between the discs 16 and 17, which may be considered, and referred to, as lenses, serves to concentrate the main or scanning field into a narrow beam, at least where the scanning field passes through the object 14.

In order to permit point-by-point scanning of the object by the concentrated beam of the main field, relative motion of the object and concentrated beam is required in two right angularly related directions lying in the plane of the object, that is, in a plane normal to the axis of the concentrated beam. Such relative motion may be produced mechanically, or by deflection of the beam shaped scanning field, and in the latter case, it would be necessary to provide a third parallel deflection field of the same kind as the scanning and concentrating fields, that is, a high frequency electric field, which undergoes movements in the desired directions, or to impart the necessary movements to the discs or lenses 16 and 17 between which the concentrating field is generated.

In the embodiment of the invention illustrated in Fig. 1, the relative movement between the beam shaped or concentrated scanning field and the object 14 required for point-by-point scanning of the latter is provided by maintaining the field in a fixed position, while the carrier 15 supporting the object is reciprocated in two right-angularly related directions, as represented by the arrows 20 and 21 on Fig. 1, lying in a plane normal to the axis of the beam shaped scanning field.

The condenser plate 12 is connected to the input of a conventional high-frequency amplifier 22, or, more specifically, to the grid of the tube forming the first stage of amplification therein, while the amplifier is grounded in the usual manner, as shown, and the output from the amplifier is fed, through a detector stage 23, to the grid 24 of a cathode ray tube 25 and modulates the intensity of the electron beam in the tube 25 so as to control or modulate the brightness of the illumination produced on the coated face of the cathode ray tube by the electron beam in the latter. It will be apparent that the circuit from the oscillator 13 to the condenser plates 11 and 12 is completed through the ground connections of the oscillator 13 and the amplifier 22. As in the tube of a conventional television receiver, the tube 25 includes deflecting plates 26 and 27 for deflecting the electron beam laterally or in the line scanning direction, and frame deflecting plates 28 and 29 for deflecting the electron beam vertically.

In accordance with this invention, the scanning of the object is synchronized with the deflection of the electron beam in the tube 25 by the plates 26, 27, 28 and 29. In the embodiment of Fig. 1, such synchronization is effected by a unit which is generally identified by the numeral 30 and operates to produce the mechanical reciprocations of the carrier 15 in the directions 20 and 21 and synchronous deflection potentials fed to the deflection and frame plates of the cathode tube 25.

Figure 2:
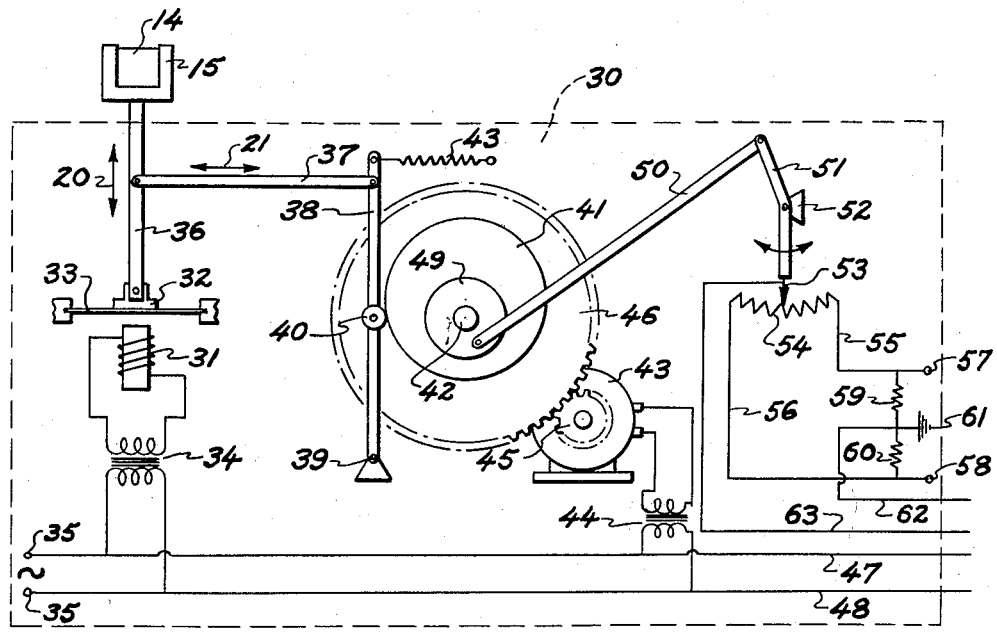
Fig. 2 is a schematic and wiring diagram showing the details of a unit employed in the device of Fig. 1.

Reference to Fig. 2 will show that the unit 30 may include a coil 31 wound around a magnetic core and cooperating with an armature 32 which is supported by a resilient diaphragm 33. The coil 31 is energized from the secondary winding of a step-down transformer 34 having its primary winding connected to terminals 35 to which alternating current is supplied. Thus, the core of coil 31 will alternately attract and repel the armature 32 at the same frequency as the alternating current supplied to the terminals 35, for example, at 60 cycles per second. The object carrier 15 is supported by a rod 36 extending pivotally from the armature 32, so that line scanning or reciprocation of the object and carrier in the direction of the arrow 20 is effected by the coil 31 cooperating with the armature at the frequency of the alternating current supply. In order to produce frame scanning of the object and carrier, that is, reciprocation of the carrier in the direction of the arrow 21, a link 37 is pivotally connected, at one end, to the rod 36 and, at its other end, to a lever 38. The lever 38 is pivotally mounted at one end, as at 39, and carries a cam follower 40 which engages the periphery of an eccentric cam 41 mounted on a shaft 42.

A spring 43 may be connected to the lever 38 to yieldably urge the latter in the direction for contacting the follower 40 with the cam 41. The eccentricity of the cam 41 with respect to the axis of rotation of shaft 42 is sufficient to produce a reciprocating movement of carrier 15, in the general direction 21, having a stroke at least as large as the corresponding dimension of the object 14, while the coil 31, armature 32 and diaphragm 33 are arranged to provide movement of the carrier through a stroke which is at least as large as the dimension of the object in the line scanning direction.

The shaft 42 is rotated at a relatively slow speed, for example, at one revolution per second, so that the carrier will be reciprocated 60 times in the line scanning direction 20 during each reciprocation of the carrier in the frame scanning direction 21. Such rotation of the shaft 42 may be effected by a slow, constant speed motor 43 which is energized from the terminals 35 through a step-down transformer 44, and which drives a relatively small gear 45 meshing with a relatively large gear 46 on the shaft 42.

The plates 26 and 27 of the cathode ray tube 25, which cause deflection of the electron beam in the line scanning direction, are fed directly from the alternating current supply, for example, by conductors 47 and 48, respectively, connected to the terminals 35, so that the line scanning movement of the carrier 15 and object 14 is directly synchronized with the line scanning movement of the electron beam.

In order to synchronize the frame movement of the electron beam of cathode ray tube 25 with the frame scanning movement of carrier 15, a crank wheel 49 is mounted on the shaft 42 and is pivotally connected to one end of a link 50 which, at its other end, is pivotally connected to a bell-crank 51 rockably mounted on a support 52. The bell-crank 51 is connected to the sliding contact 53 of a potentiometer 54, so that, as the bell-crank is rocked by rotation of crank wheel 49 with shaft 42, the sliding contact 43 will reciprocate along the resistance wire of the potentiometer. The opposite ends of the resistance wire of potentiometer 54 are connected, by conductors 55 and 56, respectively, to terminals 57 and 58 to which a source of direct current is connected, and a voltage divider, made-up of resistances 59 and 60, is provided between the terminals 57 and 58. The central point of the voltage divider is connected to ground, as at 61, and also to a conductor 62 leading to one of the plates 28 and 29, while a conductor 63 leads from the sliding contact 53 to the other of the plates 28 and 29. Thus, it is apparent that the plates 28 and 29 will be supplied with alternately varying potentials to cause frame deflection of the electron beam at the same frequency as that at which the carrier 15 and object 14 are reciprocated in the frame scanning direction 21.

When the above described device is employed as a microscope, the resolution of the microscope is determined by the diameter of the concentrated beam of the scanning field, and the degree of concentration of the scanning field, that is, the diameter of the latter, can be controlled by adjusting the potential applied to the lens-like discs 16 and 17. It is apparent that the capacity of the condenser made up of the plates 11 and 12 is determined by a number of factors, some of which are constant while others are variable. The constant factors include the size of the plates, the controlled diameter of the concentrated beam of lines of force, the distance between the plates and the physical and chemical properties of the dielectric between the plates apart from the object of which an image is desired. A variable factor influencing the capacity of the condenser is the dielectric property of the object in the beam of the scanning field as the non-homogeneous object is moved relative to the scanning beam in the manner described above. Thus, when the object 14 is reciprocated in the line scanning and frame scanning directions, the non-homogeneity of the object from pointto-point causes variations in the capacity of the condenser 11—12 which controls the output of the amplifier 22 and thereby modulates the intensity of the light at the corresponding points on the face of the tube 25 to there provide an image characteristic of the properties of the object throughout the scanned area of the latter.

Figure 4:
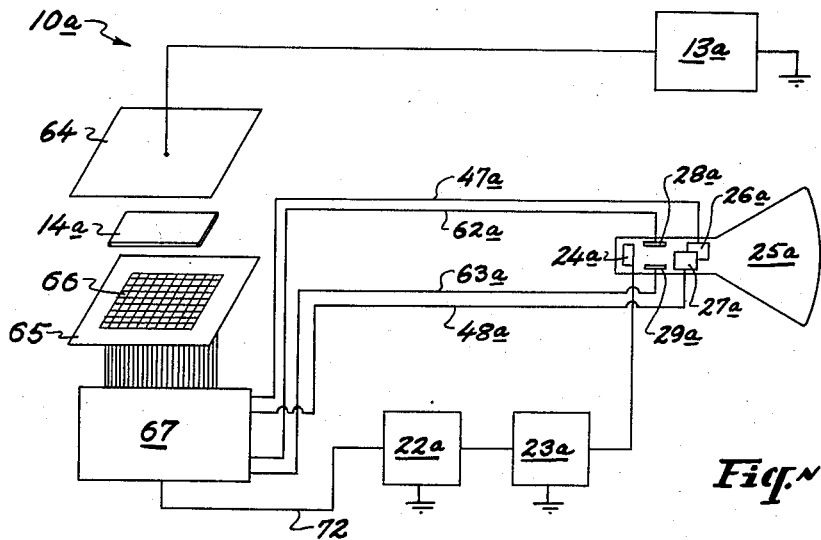
Fig. 4 is a diagrammatic view, similar to Fig. 1, but showing an image producing device constructed in accordance with another embodiment of this invention.

In the embodiment of the invention illustrated in Figs. 1, 2 and 3, the point-by-point scanning of the object is effected by concentrating the scanning field into a narrow beam and then causing relative movement of the scanning beam and object in the line scanning and frame scanning directions. However, the present invention is not limited to such an arrangement and the scanning may be otherwise effected. Thus, in the image producing device shown in Figs. 4 and 5 and generally identified by the reference numeral 10a, the object 14a, of which a characteristic image is to be produced, is fixedly held between plates 64 and 65 which form a condenser. Plate 64 is connected to one terminal or pole of an oscillator 13a having its other pole grounded, as shown, while plate 65 includes a mosaic or grid 66 of metal particles which are insulated from each other and arranged in rows and columns corresponding to scanned lines and frames, respectively. In the device 10a, a unit 67 is provided for individually connecting the metal particles of the mosaic 66 in a predetermined sequence to a high frequency amplifier 22a which is grounded in the usual manner so that the circuit from the oscillator 13a to the condenser plates 64 and 65 can be completed through the ground connections of the oscillator 13a and amplifier 22a, the output of the amplifier 22a being fed, through a detector stage 23a, to the grid 24a of a cathode ray tube 25a, and for synchronously varying the potentials applied to the line deflecting plates 26a and 27a and to the frame deflecting plates 28a and 29a of the tube 25a so that, at any instant, the electron beam in the cathode ray tube will be directed at a point on the face of the latter corresponding to the position, in the mosaic 66, of the metal particle then connected to the input of the amplifier 22a.

As the individual metal particles of the mosaic 66 of plate 65 are connected in predetermined sequence to the amplifier 22a, the capacity of the condenser formed at any instant by the plate 64 and the connected particle of the mosaic 66 will be affected by the dielectric properties of that portion of the object 14a aligned with the then connected metal particle, so that the capacity of the condenser will vary when the parts of the object aligned with the several particles of the mosaic 66 are not homogeneous and will control or modulate the intensity of the electron beam in the tube 25a.

Figure 5:
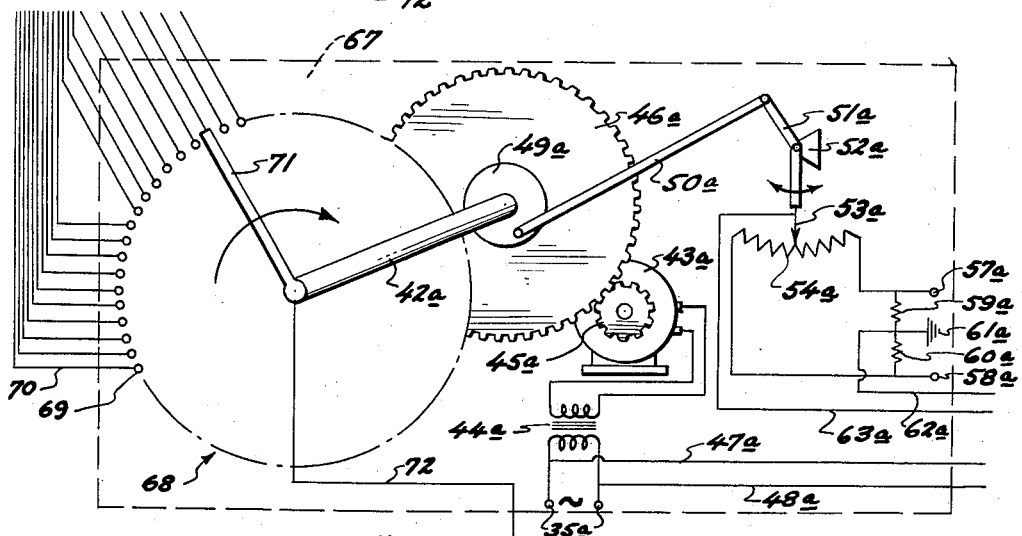
Fig. 5 is a schematic and wiring diagram showing the details of a unit that may be employed in the device of Fig. 4.

As seen in Fig. 5, the unit 67 may include a switching arrangement or distributor, generally identified by the numeral 68, which includes a circularly arranged series of fixed contacts 69, each of which is connected, by a conductor 70, to a related one of the metal particles of mosaic 66, and a movable or slide contact 71 which is connected to the input of amplifier 22a by a conductor 72 and is mounted radially on a shaft 42a so that, as the latter is rotated, the movable contact 71 successively engages the fixed contacts 69.

In the image producing device 10a, the variations in the deflection potentials applied to the line deflecting plates 26a and 27a and to the frame deflecting plates 28a and 29a may be effected by an arrangement which is similar to that described in connection with Fig. 2 and includes parts identified by the same reference numerals, but with the letter "a" appended thereto. Thus, variations in the deflection potentials applied to the line deflecting plates 26a and 27a through the conductors 47a and 48a result from the connection of the latter to the terminals 35a at which alternating current is supplied, so that the line deflection is at the frequency of the alternating current supply, while variations in the deflection potentials applied to the frame deflection plates 28a and 29a are produced by the reciprocation of the slide contact 53a along the resistance wire of the latter. As in the first described embodiment, the reciprocation of slide contact 53a is effected at a slow frequency, for example, 1 cycle per second, through the action of a crank wheel 49a on shaft 42a and which is connected, by a link 50a, to a bellcrank 51a carrying the slide contact. Thus, the rotation of the movable contact 71 of the distributor is synchronized with the movement of slide contact 53a, and these movements are, in turn, synchronized with the frequency of the variations in the potentials supplied to the line deflecting plates 26a and 27a by reason of the fact that the motor 43a which drives the shaft 42a is energized by the alternating current supplied to the terminals 35a.

The connections of the contacts 69 of the distributor 68 to the several metal particles of the mosaic 66 are arranged so that, during each complete revolution of shaft 42a, which represents a frame scanning cycle in the cathode ray tube 25a, the rows of particles in the mosiac 66 will be successively connected to the input of amplifier 22a, the succession being first in one direction and then in the other direction. Thus, if the several rows of particles in the mosaic 66 are referred to as rows a, b, c, d and e, merely for the purpose of illustration, the circularly arranged series of contacts 69 would be connected to particles in the several rows, so that, during each complete circuit of the fixed contacts 69 by the movable contact 71, the latter would engage, in order, fixed contacts connected to the particles of row a, fixed contacts connected to the particles of row b, fixed contacts connected to the particles of row c, fixed contacts connected to the particles of row d, fixed contacts connected to the particles of row e, fixed contacts connected to the particles of row d, fixed contacts connected to the particles of row c and fixed contacts connected to the particles of row b.

Further, the constant speed motor 43a and the ratio of the gears 45a and 46a are selected so that during each line scanning cycle, as determined by the frequency of the alternating current supplied to the terminals 35a, the movable contact 71 of the distributor will traverse a group of fixed contacts 69 associated with the particles in one row of the mosaic 66.

In the absence of an object 14a between the plates 64 and 65, a homogeneous field with practically straight lines of force develops in the region of the mosaic 66, and the capacities of the particles of the latter, relative to the condenser plate 64, are the same. However, introduction of the object 14a between the plates 64 and 65 disturbs the homogeneity of the field and the intensity of the field acting on the several particles of mosaic 66 then varies in accordance with the field influencing chemical and physical properties at the related points of the object. Thus, as the electron beam of tube 25a is deflected in the line scanning and frame scanning directions in synchronism with the sequential connection of the particles of mosaic 66 to the amplifier 22a, the intensity of the electron beam is modulated to provide an image on the face of the tube that is characteristic of the physical and chemical properties of the object influencing the field of force.

It is apparent that the described embodiments of the invention can produce images of the same size as the scanned objects, or images that are larger or smaller than the scanned objects. Further, devices constructed in the manner described above are of value in determining the dielectric constant, power factor and conductivity of organic cells and their structure, so that previously unknown information may be obtained regarding the character of living matter. It is also apparent that the object scanning portion of each of the described devices may be remotely located with respect to the image producing tube 25 or 25a so that relatively inaccessible objects may be scanned, for example, objects subject to high temperatures, poisonous gases and the like. Since the physical and chemical properties of substance vary with the frequency of the field to which they are subjected, modified images characteristic of the properties of an object at different frequencies can be obtained to permit qualitative analysis of the object. The devices embodying this invention are adapted for the examination of fabrics, synthetic fibers and materials, and other dielectrics, as well as living matter, and therefore can have widespread application in medical, biological, chemical and engineering research. Further, by adapting the described devices so that the object is scanned by a magnetic field, rather than an electric field, the devices may be applied to metallurgical studies, for example, of alloys. Finally, it is to be noted that the object scanning portion of each of the described devices may be positioned adjacent an assembly line, in order to permit inspection or quality control of the successive mass-produced objects on the line.

Although particular embodiments of the invention have been described in detail and shown in the accompanying drawings, the invention is not limited to those particular embodiments, and various changes and modifications may be effected therein without departing from the scope or spirit of the invention as defined in the appended claims.

What is claimed is:

1. A device for producing an image characteristic of the variations in the chemical and physical properties within an object; said device comprising means creating a field of force, means concentrating said field so that the lines of force of the latter are moved together into a narrow beam which is influenced by the chemical and physical properties of an object extended across said beam at the relatively small area of the object which intercepts the beam, means effecting relative movement of said beam and object in directions generally normal to the axis of said beam so that the latter systematically scans all of the objects and is varied in correspondence with the variations in the chemical and physical properties throughout the object, and means synchronized with the systematic scanning of the object by said beam and responding to the variations in the latter to produce an image characteristic of said variations in said beam, and hence, in the chemical and physical properties of the object.

2. A device according to claim 1; wherein said concentrating means includes means generating a field of force of the same kind as the first mentioned field of force and interacting with the latter to concentrate the lines of force of said first field into a narrow beam.

3. A device according to claim 1; wherein said means effecting relative movement of said beam and object includes means mechanically reciprocating said object in two right angularly related directions lying substantially in a plane normal to the axis of said beam.

4. A device for producing an image characteristic of the variations in the chemical and physical properties within an object; said device comprising means creating a field of force, means concentrating said field so that the lines of force of the latter are moved together into a narrow beam which is influenced by the chemical and physical properties of an object extended across said beam at the relatively small area of the object which intercepts the beam, means effecting relative movement of said beam and object in directions generally normal to the axis of said beam so that the latter systematically scans all of the object and is varied in correspondence with the variations in the chemical and physical properties throughout the object, a cathode ray tube having deflection plates for deflecting the electron beam thereof and a grid for controlling the intensity of the electron beam, means operative to supply deflection potentials to said plates in synchronism with said means effecting the relative scanning movement of said beam and object so that, at any instant, the electron beam of the cathode ray tube is directed at a point on the face of the latter corresponding to the point on the object then intercepting said beam, and means responding to variations in said field of force caused by the varying influence of the scanned points of the object upon the field and operative to correspondingly modulate the current to said grid of the tube so that the intensity of the electron beam is varied to thereby create an image on the face of the tube which is characteristic of the properties of the object influencing the field.

References Cited in the file of this patent

UNITED STATES PATENTS

| 2,519,367 | Gunn et al. | Aug. 22, 1950 |
| 2,558,485 | Gow | June 26, 1951 |
| 2,659,048 | Zabel et al. | Nov. 10, 1953 |
| 2,696,522 | Rines | Dec. 7, 1954 |
| 2,760,105 | Michaels | Aug. 21, 1956 |
| 2,806,204 | Rothacker | Sept. 10, 1957 |

FOREIGN PATENTS

| 273,999 | Switzerland | June 16, 1951 |